D. M. CONVERSE.
GRAIN HEADER ATTACHMENT FOR TRACTORS.
APPLICATION FILED FEB. 15, 1919.
1,312,389.
Patented Aug. 5, 1919.
2 SHEETS—SHEET 1.
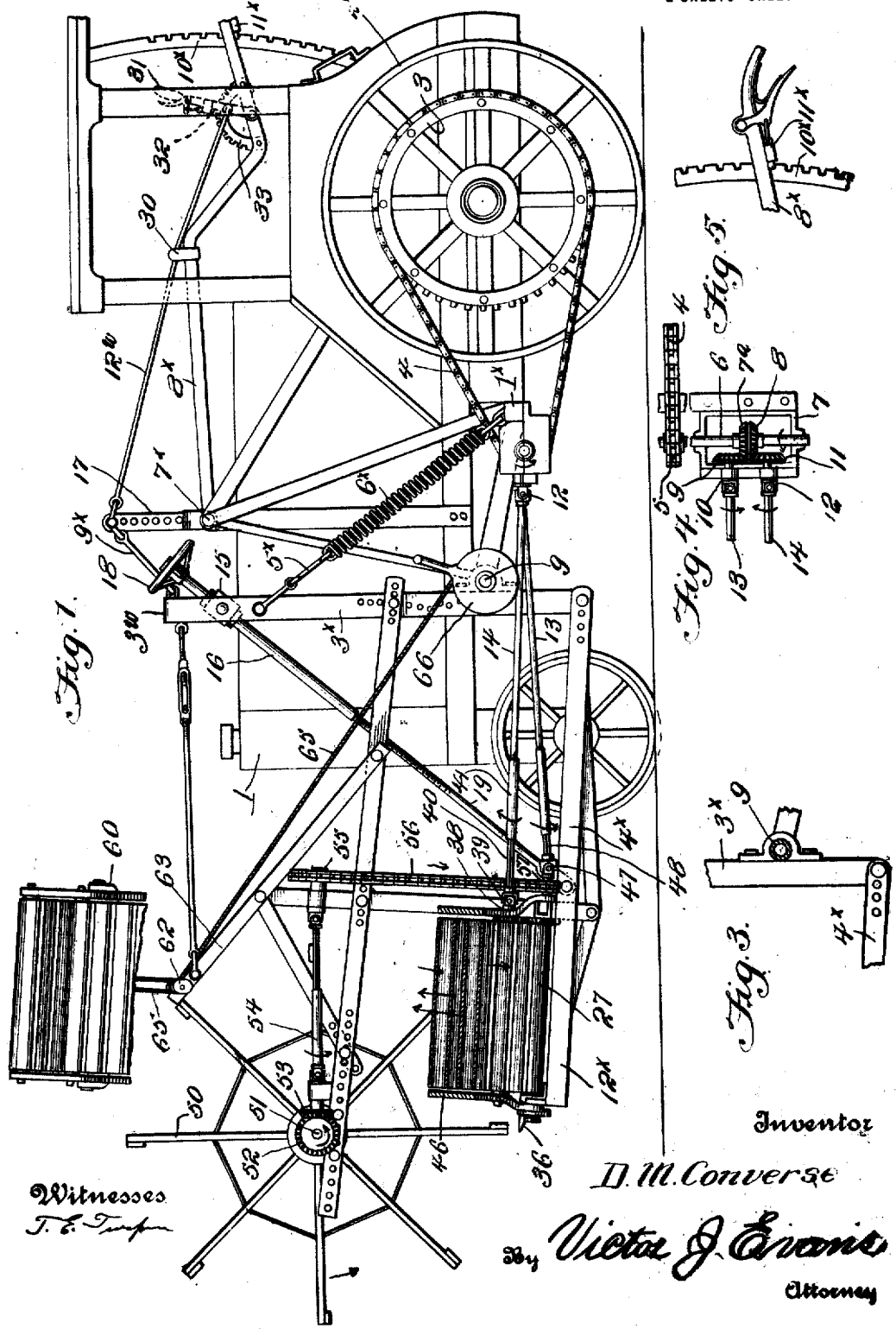
Witnesses
Inventor
D. M. Converse
By Victor J. Evans
Attorney

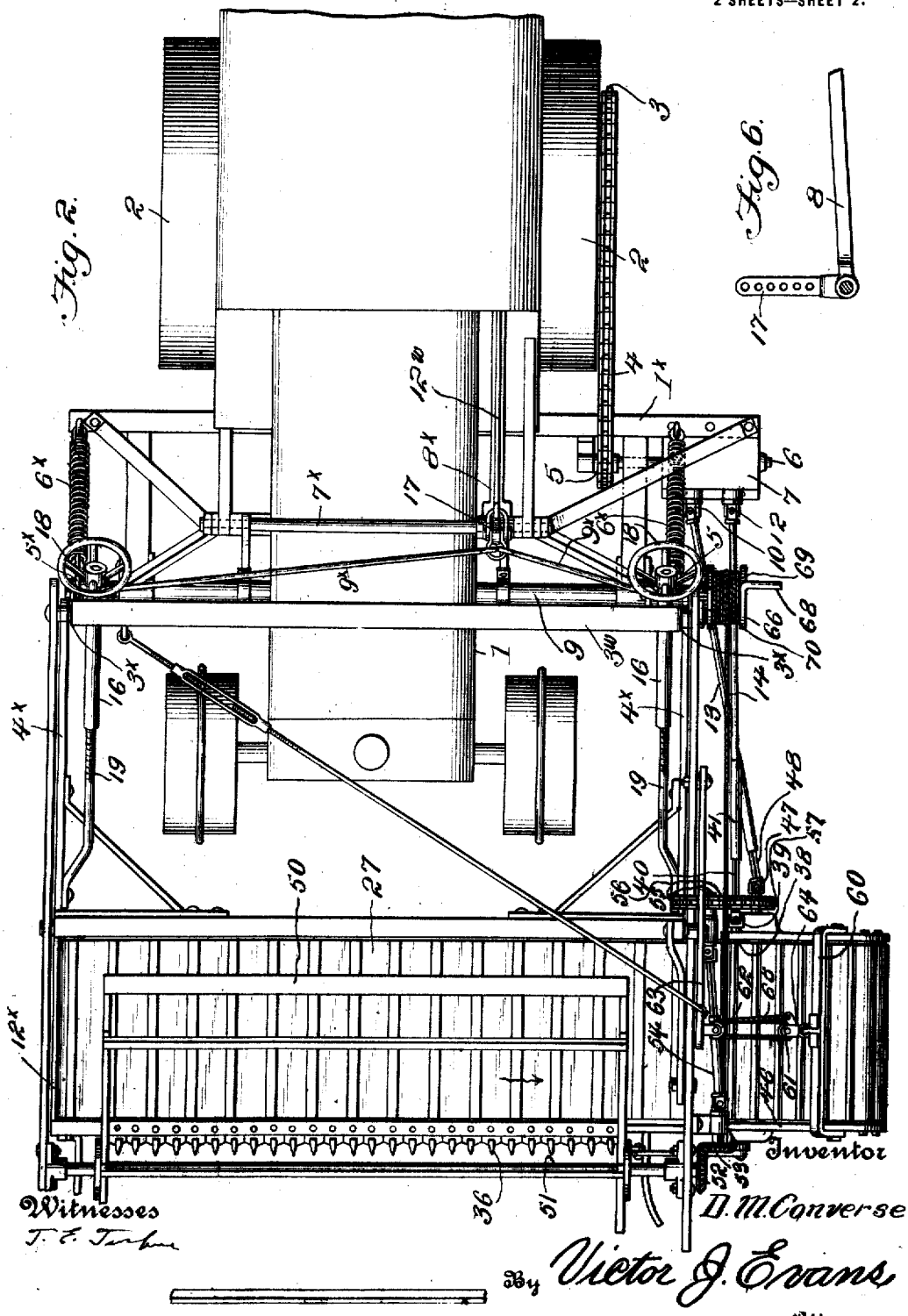

UNITED STATES PATENT OFFICE.

DAN M. CONVERSE, OF ALBERT, KANSAS.

GRAIN-HEADER ATTACHMENT FOR TRACTORS.

1,312,389.  Specification of Letters Patent.  Patented Aug. 5, 1919.

Application filed February 15, 1919. Serial No. 277,282.

*To all whom it may concern:*

Be it known that I, DAN M. CONVERSE, a citizen of the United States, residing at Albert, in the county of Barton and State of Kansas, have invented new and useful Improvements in Grain-Header Attachments for Tractors, of which the following is a specification.

My present invention is designed more particularly as an improvement upon the detachable grain header or header attachment constituting the subject matter of my contemporary application filed December 1, 1917, Serial Number 204,936; and it consists in the improved general construction, in the improved means for adjusting and adjustably fixing the header, and in the improved means for driving the working parts of the header from one of the ground wheels of the tractor, as hereinafter described and definitely claimed.

In the accompanying drawings, hereby made a part hereof:

Figure 1 is a broken view partly in elevation and partly in section and showing the tractor and header.

Fig. 2 is a plan view of the same.

Fig. 3 is a detail section showing the pivot bar, one of the upright arms pivoted on said bar, and one of the rearwardly extending arms of the header frame connected to said upright arm below the pivot bar.

Fig. 4 is a detail of the driving connection to the working parts of the header.

Fig. 5 is a detail view of the rear portion of the main adjusting lever.

Fig. 6 is a detail showing the connection of the forward portion of said main adjusting lever.

Similar numerals designate corresponding parts in all of the views of the drawings.

The tractor 1 in general is of the ordinary well known construction, and in furtherance of my invention one of its ground wheels 2 and which is preferably a traction wheel, is equipped with a sprocket gear 3. On said sprocket gear 3 is mounted a sprocket belt 4 which is also mounted on a sprocket gear 5, Fig. 4, fixed on a transverse shaft 6 that is journaled in a casing 7 carried by a supplemental frame 1$^x$ to the tractor frame. Said shaft 6 has fixed thereon oppositely beveled gears 7$^a$ and 8. The gear 7$^a$ is intermeshed with a beveled gear 9 on a stub shaft 10, while the beveled gear 8 is intermeshed with a beveled gear 11 on a stub shaft 12. The stub shaft 10 is connected through a universal joint with a shaft 13 for transmitting motion to the apron of the header, and the stub shaft 12 is connected through a similar joint with a shaft 14 for transmitting motion to the elevator of the header, as hereinafter definitely set forth.

Secured to the tractor frame at a point intermediate of the front wheels and the rear wheels is a transverse pivot bar 9 that extends laterally beyond the wheels at both sides of the tractor. Pivoted at intermediate points of their length on the said bar 9 are upright arms 3$^x$ which are connected together at their upper ends by a cross-bar 3$^w$, Fig. 2. The header platform 12$^x$ is provided with rearwardly extending arms 4$^x$, the rear ends of which are adjustably connected with the lower ends of the upright arms 3$^x$. Pivoted on each arm 3$^x$ is a bearing sleeve 15 in which is supported for rotation an internally threaded tube 16, held against endwise movement in the bearing 15 and equipped with a hand wheel 18, whereby it may be turned about its axis. Threaded into the tubes 16 are rods 19, the lower ends of which are pivotally connected with the arms 4$^x$. By turning the hand wheels 18, the arms 4$^x$ may be readily raised or lowered to properly position the header platform 12$^x$.

The supplemental frame 1$^x$ is extended laterally at opposite sides of the tractor, as shown in Fig. 2, and connected to and interposed between the laterally extended frame portions and the upper portions of the upright arms 3$^x$ are retractile springs 6$^x$. The connections between the upper ends of said springs and the arms 3$^x$ are effected by links 5$^x$, and manifestly the springs will operate to counterbalance the weight of the header.

Arranged transversely above the forward portion of the tractor is a transverse rod 7ˣ which is preferably, though not necessarily, supported and braced on the tractor frame and the supplemental frame 1ˣ in the manner illustrated. Mounted on and rising from the rod 7ˣ is an arm 17, and interposed between and connecting the upper portion of the arm 17 and the upper portions of the upright arms 3ˣ are link rods 9ˣ. From this it follows that rearward movement of the arm 17 will be attended by upward movement of the header platform 12ˣ, while forward movement of the arm 17 will be attended by downward movement of said platform 12ˣ. Movable with or on the transverse rod 7ˣ, though independently of the arm 7ˣ is the hand lever 8ˣ for the manual raising and lowering of the header platform. Said lever 8ˣ is provided at 11ˣ with a detent to engage a curvilinear rack 10ˣ fixed with respect to the tractor cab, and designed to permit of the header platform being adjustably fixed. Extending loosely through a guide 30 on the hand lever 8ˣ is a rod 12ʷ connected at its forward end to the upper portion of the arm 17. At its rear end said rod 12ʷ is connected to a hand lever 31 that is pivoted on the hand lever 8ˣ and is provided with a detent 32 to engage a segmental rack 33 on the hand lever 8ˣ, it being remembered that the arm 17 is movable independently of the lever 8ˣ, it will be readily understood that without movement of the lever 8ˣ the header platform 12ˣ may be raised or lowered to a slight extent—i. e., may be nicely adjusted through the medium of the hand lever 31 and without movement of the hand lever 8ˣ. When, however, material movement of the header platform 12ˣ is desired, such movement is effected through the medium of the hand lever 8ˣ, and then said hand lever 8ˣ is adjustably fixed to maintain the header platform 12ˣ in the position desired.

The header platform is provided with cutting apparatus 36 and also an apron 27, the latter being trained over rollers at the ends of the platform, one of the rollers being connected through a universal joint 39 with a shaft section 40 of angular form in cross-section which is movable endwise but held against turning in a socket portion 41 of the shaft 13.

Supported for swinging movement on the header platform is an elevator frame 46 having opposed aprons the lower rollers of which are connected by gearing, and one of which rollers is connected through a universal joint 47 with an angular shaft 48 which is movable endwise in but turns with the socket portion of the shaft 14. Thus it will be manifest that notwithstanding motion is taken from the shaft 6, the conveyer apron 27 and the opposed aprons of the elevator will be driven in the proper directions.

Supported in proper relation to the cutting apparatus and the apron 27 is a reel 50 on a shaft 51, which shaft is equipped with a beveled gear 52 intermeshed with a beveled gear 53 on an endwise extensible shaft 54, the rear section of which is equipped with a sprocket gear 55, connected through a sprocket belt 56 with a sprocket gear 57 on the roller shaft that derives motion from the shaft 13.

A bar 60 on the elevator frame carries a pulley block 61, a similar pulley block 62 being carried on a supporting bar 63. Connected with a bracket 64 extending at one side of the block 61 is one end of a cable 65, the said cable being reeved through the pulley block and connected with a drum 66 that is mounted on the pivot bar 9. The said drum is equipped with a crank 68, and is provided with a ratchet 69 designed to be engaged by a pawl 70 with a view to preventing retrograde rotation. Manifestly rotation of the drum 66 will be attended by raising or lowering of the free end of the elevator frame.

It will be apparent from the foregoing that the improvements herein disclosed constitute steps forward in the art and increase the practical utility of the tractor constituting the subject matter of my before cited header attachment for tractors.

Having described my invention, what I claim and desire to secure by Letters-Patent, is:

1. The combination of a wheeled frame, a transverse pivot bar mounted on the frame and extending laterally beyond the sides thereof, upright arms pivoted on the end portions of said bar and extending above and below the same, a header positioned in front of the frame and having rearwardly extending arms pivotally connected to the upright arms below the pivot bar, means connecting the upper portions of the upright arms and the forward portions of the rearwardly extending arms, an upwardly extending arm mounted on the frame and connected with the upper portions of said upright arms, a lever mounted on the frame and movable independently of said upwardly extending arm, means whereby said lever may be adjustably fixed to the frame, a hand lever mounted on the first-named lever, a connection between said second-named lever and the upwardly extending arm, and means whereby the second-named lever may be adjustably fixed with respect to the first-named lever.

2. The combination of a wheeled frame, upright arms pivotally mounted at intermediate points in their length on said frame, a header in front of the frame and having rearwardly extending arms pivotally connected to the lower portions of the upright arms, means connecting the upper portions of the upright arms and the forward portions of the rearwardly extending arms, an arm mounted on the frame and connected with the upper portions of the upright arms, a hand lever mounted on the frame, means for adjustably fixing said hand lever with respect to the frame, a hand lever on the first-named hand lever, a connection between the second-named hand lever and the upwardly extending arm, and means for adjustably fixing the second-named hand lever.

In testimony whereof I affix my signature.

DAN M. CONVERSE.